(12) United States Patent
Veltrop et al.

(10) Patent No.: US 6,909,070 B2
(45) Date of Patent: Jun. 21, 2005

(54) FOOD PRODUCT STEAMER

(75) Inventors: Loren J. Veltrop, Deerfield, IL (US); Lawrence G. Banovez, Kenoshi, WI (US)

(73) Assignee: Prince Castle Inc., Carol Stream, IL (US)

(*) Notice: Subject to any disclaimer, the term of this patent is extended or adjusted under 35 U.S.C. 154(b) by 91 days.

(21) Appl. No.: 10/184,831

(22) Filed: Jun. 28, 2002

(65) Prior Publication Data

US 2004/0000541 A1 Jan. 1, 2004

(51) Int. Cl.$^7$ ................................................. A21B 1/00
(52) U.S. Cl. ..................... 219/401; 219/405; 219/402; 219/407; 219/408; 219/391; 219/385; 219/387; 99/483; 99/456; 126/20; 126/20.1; 126/369; 126/369.2
(58) Field of Search ................................ 219/401–402, 219/405, 407–408, 391, 385–387, 393; 99/483, 456; 126/20, 20.1–20.2, 369, 369.2–369.3

(56) References Cited

U.S. PATENT DOCUMENTS 3,735,749 A * 5/1973 Binks et al. ................... 126/20

* cited by examiner

Primary Examiner—Shawntina Fuqua
(74) Attorney, Agent, or Firm—John R. Hoffman

(57) ABSTRACT

A steamer apparatus for steaming bread-type food products includes a housing defining a steam chamber having a heated platen therein. A water conduit delivers water onto the heated platen to convert the water into steam in the steam chamber. The water in the conduit is preheated by the heated platen, itself, prior to delivering the water to the heated platen.

22 Claims, 7 Drawing Sheets

FOOD PRODUCT STEAMER

FIELD OF THE INVENTION

This invention generally relates to the art of steamers for food products and, particularly, to a steamer apparatus for steaming bread-type food products including buns, rolls, croissants, bagels and the like.

BACKGROUND OF THE INVENTION

Various types of steamers are used in restaurants or the like for freshening bread-type food products ranging from bread slices to buns, rolls, croissants, bagels and the like. Such steamers are used particularly in large volume food handling operations such as fast-food restaurants and/or drive-in restaurants.

Heretofore, such steamers often have been boiler-type steamers which are fairly expensive and can run into thousands of dollars per unit. Typical steamers are called "flash" steamers wherein water is deposited or sprayed onto the surface of a heated platen which "flashes" or converts the water to steam. The steam impregnates the bread-type food products to freshen the products. If the water is supplied at room temperature or line temperature, the heated platen must be maintain at a very high temperature or be quite robust in order to maintain a sufficiently high temperature to quickly cause the water to reach the flashing point.

The present invention is directed to an extremely simple steamer apparatus which will cost a fraction of existing boiler-type steamers, by using a concept of preheating the water to a point close to the flashing point before spraying the water onto the heated platen. Therefore, the water is instantaneously converted to steam and the food products, correspondingly, are steamed in a matter of seconds. Preheating the water is accomplished without adding any additional heating means whatsoever to the steamer apparatus.

SUMMARY OF THE INVENTION

An object, therefore, of the invention is to provide a new and improved steamer apparatus for steaming bread-type food products such as buns, rolls, croissants, bagels and the like.

In the exemplary embodiment of the invention, the steamer apparatus includes a housing which defines a steam chamber having a heated platen therein. Water delivery means are provided for delivering water onto the heated platen to convert the water into steam in the steam chamber. Means are provided for preheating the water in the housing prior to delivering the water to the heated platen.

As disclosed herein, the water delivery means include a water conduit in which the water is preheated. A preheating chamber is provided in proximity to the heated platen, with at least a portion of the water conduit disposed therein. Therefore, the preheating chamber and/or the water conduit is preheated by the heated platen. The platen thereby performs a dual function of converting the water to steam and preheating the preheating chamber and/or water conduit. Consequently, no additional or extraneous heating means are required to preheat the water prior to delivery to the heated platen.

According to one aspect of the invention, the heated platen is part of a one-piece heated module which has a bottom wall and side walls defining the bottom wall and side walls of the steam chamber. The heated module is fabricated of cast metal material such as aluminum or the like. At least one heating element is cast into at least the bottom wall of the heated module. A perforated venturi plate is spaced above the bottom wall and spans the side walls to substantially enclose the steam chamber.

According to another aspect of the invention, the water delivery means includes a nozzle at the end of the water conduit communicating with the steam chamber for spraying water onto the heated platen. The steam chamber is divided into at least two portions, and a deflector is provided for deflecting the water from the nozzle into both chamber portions.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
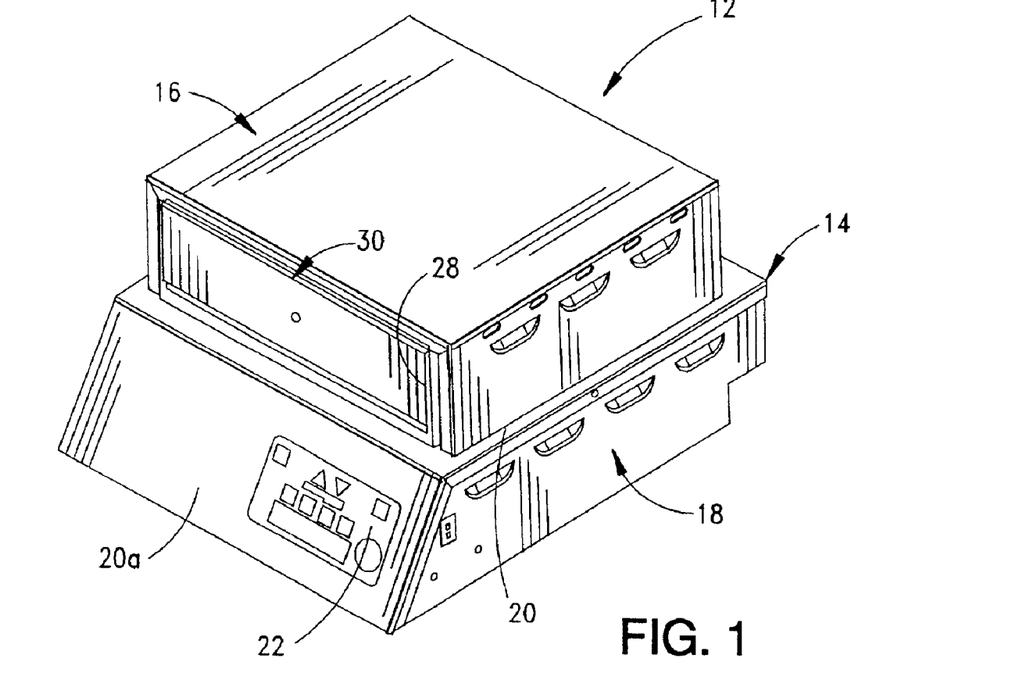
FIG. 1 is a perspective view of a steamer apparatus incorporating the concepts of the invention.
Figure 2:
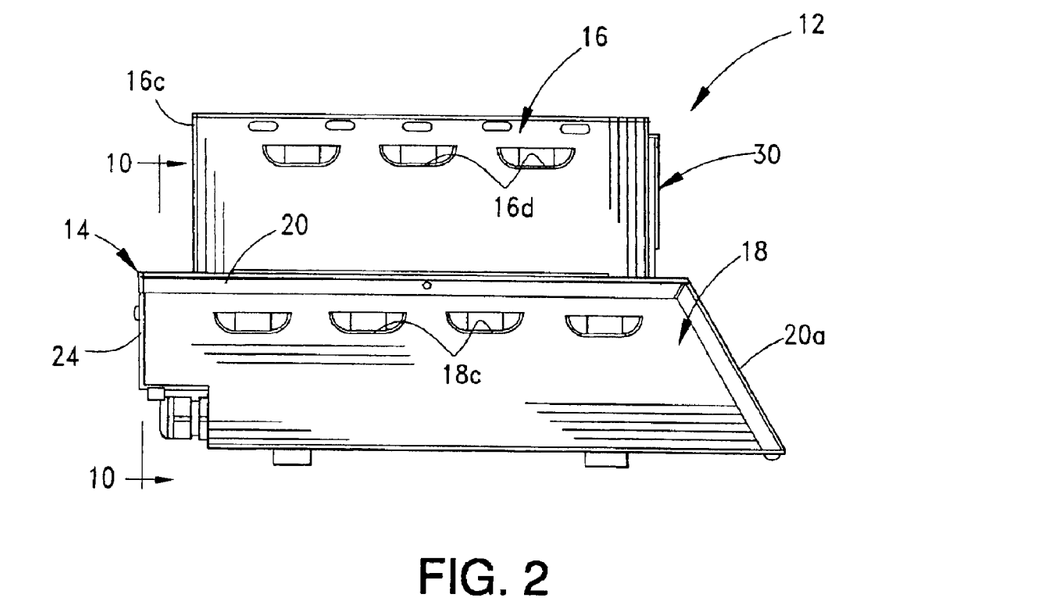
FIG. 2 is a side elevational view of the steamer apparatus, looking at the left-hand side of FIG. 1.
Figure 3:
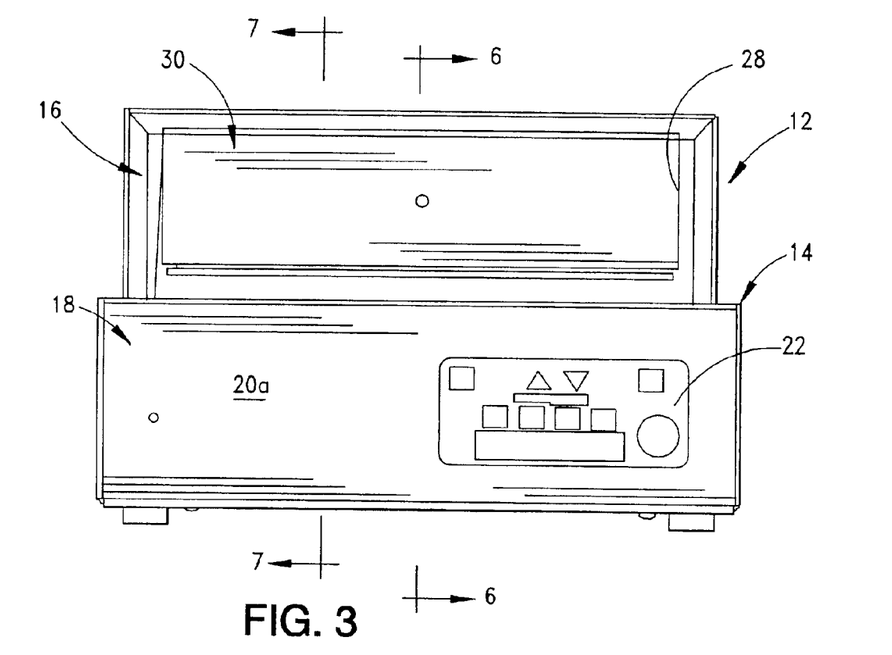
FIG. 3 is a front elevational view of the steamer apparatus.
Figure 4:
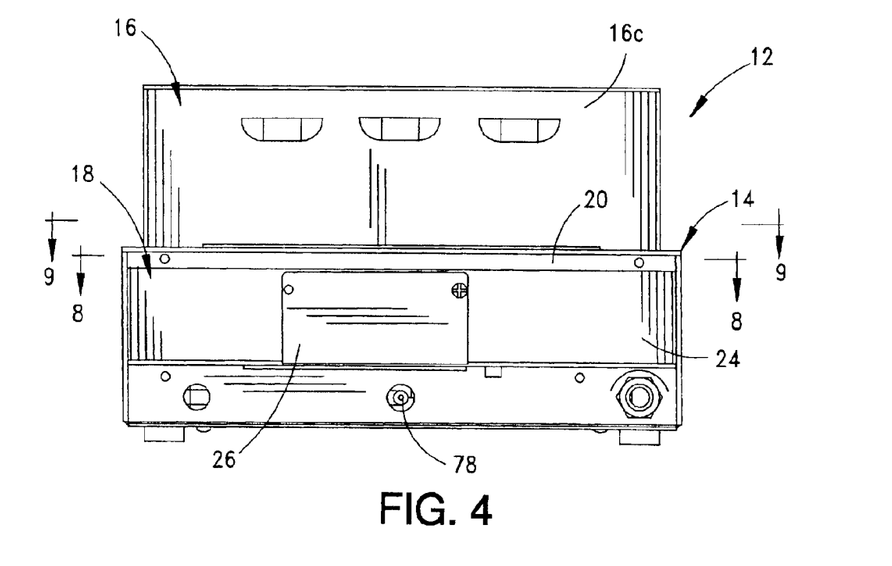
FIG. 4 is a rear elevational view of the steamer apparatus.

Referring to the drawings in greater detail, and first to FIG. 1, the invention is embodied in a steamer apparatus, generally designated 12, for steaming bread-type foods products which may include bread slices, buns, rolls, croissants, bagels and the like. The steamer includes a housing, generally designated 14, which basically has an outer shell and inner support components. The outer shell is defined by a top shell half, generally designated 16, and a bottom shell half, generally designated 18, with an intermediate shell plate 20 disposed therebetween. The intermediate shell plate has a downwardly bent front wall 20a onto which a control panel 22 is mounted. A rear plate 24 (FIGS. 2 and 4) closes the bottom rear of the outer shell of the housing, and a removable door 26 (FIG. 4) allows access to the interior of the apparatus at the rear thereof. Top shell half 16 has a front opening 28 (FIG. 1) into which food products are loaded into the steamer by means of a food tray, generally designated 30, and described hereinafter.

At this point, it should be understood that all of the fasteners, water pipes or tubes and electrical wiring are not shown in the drawings in order to avoid cluttering the clear depictions of the figures. With many of the shell and housing components being fabricated of sheet metal material, one skilled in the art obviously can readily secure the components together. The same holds true for the electrical wiring and the pipes which interconnect the water conduits described herein.

Figure 5:
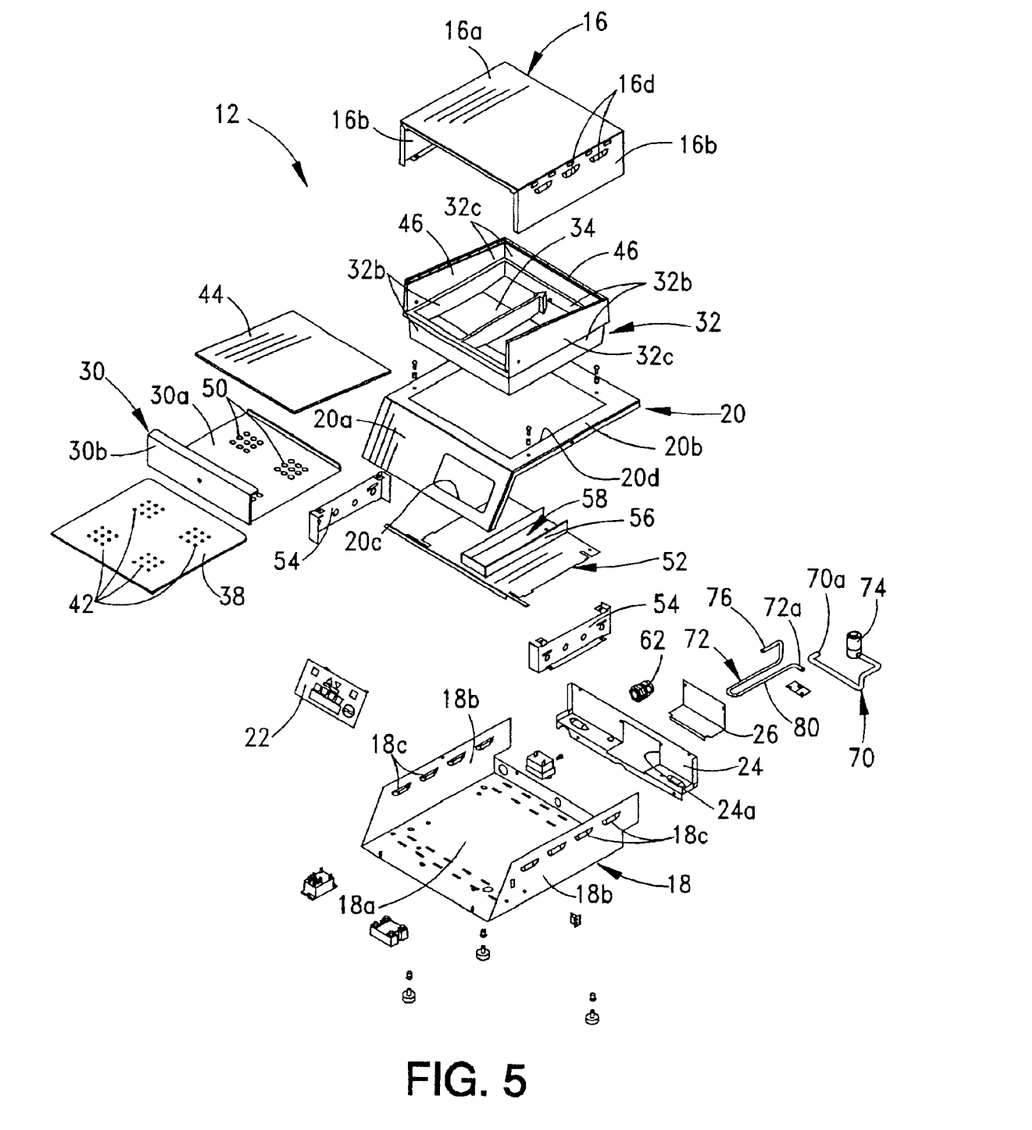
FIG. 5 is an exploded perspective view of the steamer apparatus.

Referring to FIG. 5 in conjunction with FIGS. 1–4, top shell half 16, bottom shell half 18, intermediate shell plate 20, rear wall 24 and door 26 all are fabricated of sheet metal material. It can be seen in FIG. 5 that bottom shell half 18 is generally U-shaped and includes a bottom wall 18a and side walls 18b, with vents 18c formed in the side walls. Top shell half 16 has a generally inverted U-shape including a top wall 16a, side walls 16b and a rear wall 16c (FIGS. 2 and 4), with vents 16d formed in the side walls. Intermediate shell plate 20 includes a rectangular wall 20b, with front wall 20a sloped downwardly from the front thereof. The front wall has an aperture 20c within which control panel 22 is mounted. Wall 20b has a rather large rectangular opening 20d within which a one-piece heated module, generally designated 32, is mounted. Rear wall 24 is generally L-shaped and includes an opening 24a within which door 26 is mounted.

The one-piece heated module 32 preferably is fabricated of cast metal material such as aluminum or the like. The heated module includes a bottom wall 32a (FIG. 7) which provides a heated platen with a main flashing surface 34 on the top thereof. Side walls 32b project upwardly from bottom wall 32a to define a steam chamber, generally designated 36, therewithin. A perforated venturi plate 38 seats onto top ledges 40 of side walls 32b above bottom wall 32a and flashing surface 34 to substantially close steam chamber 36. As seen in FIG. 5, venturi plate 38 has a plurality (four) clusters of perforations 42 through which steam passes upwardly from steam chamber 36.

Figure 6:
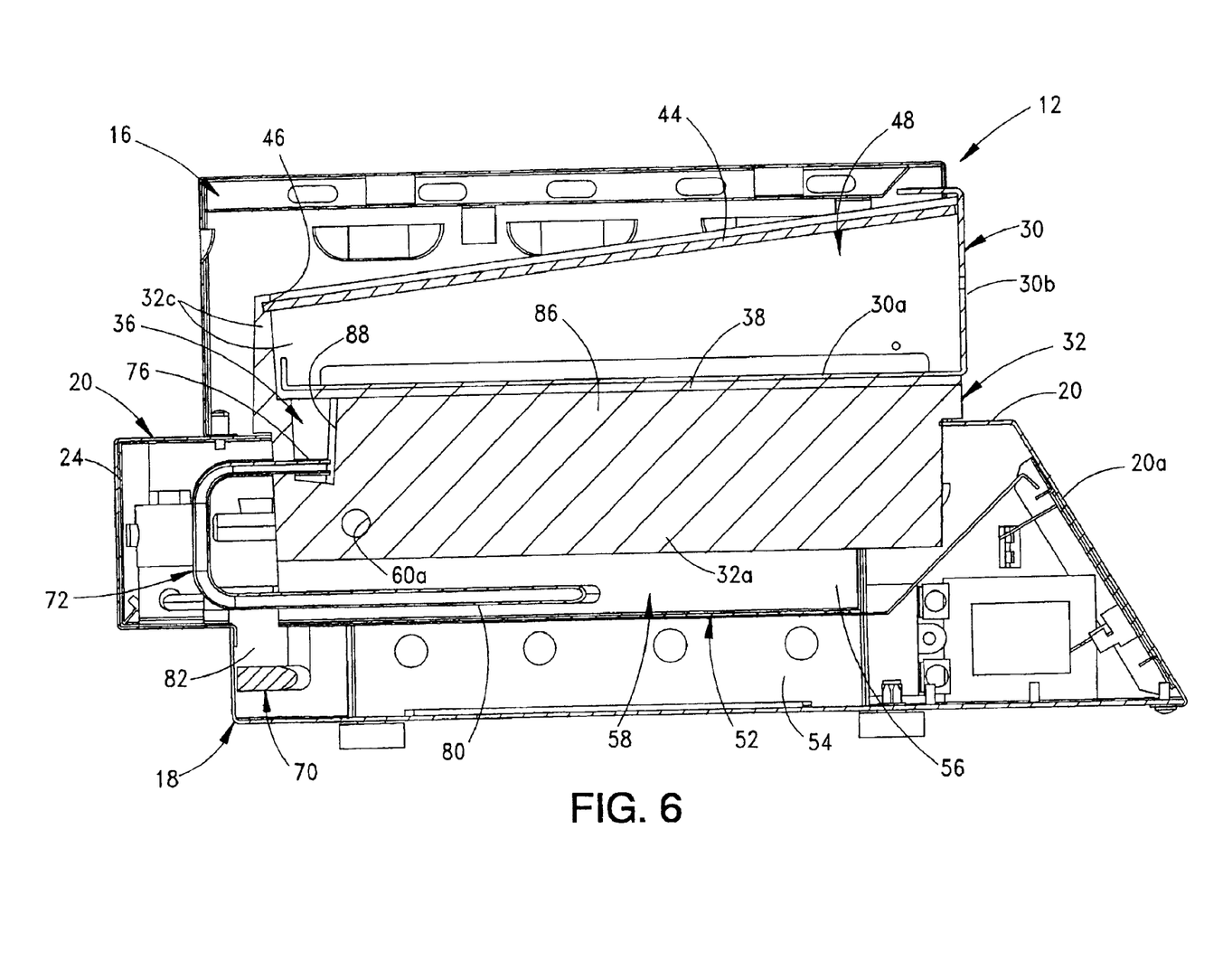
FIG. 6 is a vertical section taken generally along line 6—6 of FIG. 3.
Figure 7:
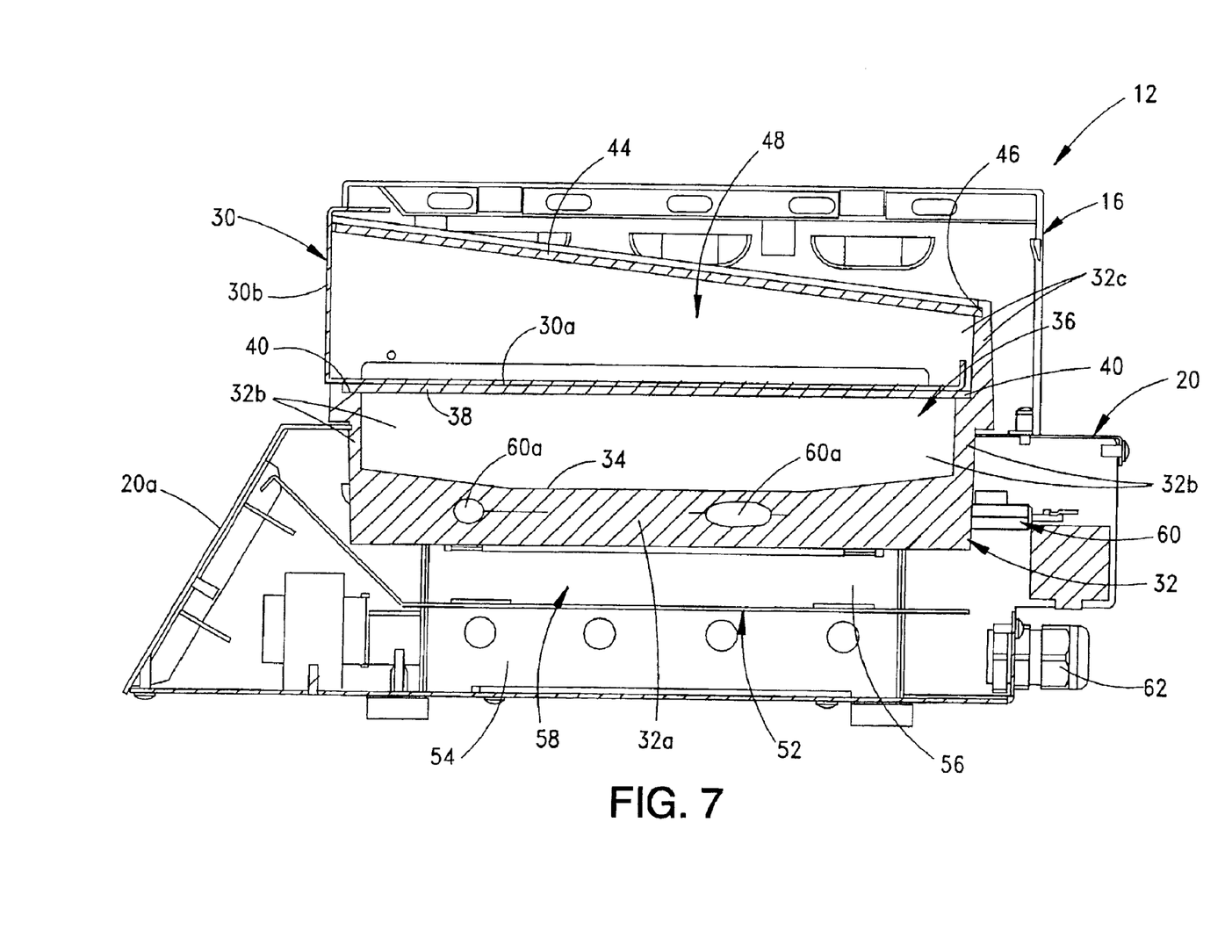
FIG. 7 is a vertical section taken generally along line 7—7 of FIG. 3.

Still referring to FIGS. 5–7, side walls 32b of heated module 32 have top wall extensions 32c which project upwardly from ledges 40 and perforated venturi plate 38. A top plate 44 is inserted into grooves 46 inside the top edges of top wall extensions 32c. Therefore, the top wall extensions, along with perforated venturi plate 38 and top plate 44 form a front-opening heated chamber, generally designated 48, above steam chamber 36 and separated therefrom by venturi plate 38. In other words, since heated module 32 is a one-piece structure, the heating elements (described hereinafter) in the bottom wall of the structure are effective to heat top wall extensions 32c and the chamber 48 therewithin.

Food tray 30 has a horizontal tray portion 30a and a front wall portion 30b. The food tray is shown inserted into heated chamber 48 in FIGS. 6 and 7. When so inserted, it can be seen that horizontal tray portion 30a is juxtaposed on top of perforated venturi plate 38, while front wall portion 30b closes the front of heated chamber 48. As seen in FIG. 5, horizontal tray portion 30a of the food tray has a pattern of perforations 50 matching the pattern of perforations 42 through venturi plate 38. Perforations 50 in the food tray may be slightly larger than perforations 42 in venturi plate 38 to ensure that the perforations in the venturi plate are in registry with the perforations in the food tray so that steam from steam chamber 36 passes through the perforations into heated chamber 48. Typically, bread-type food products will be placed on horizontal tray portion 30a of the food tray directly over perforations 50. For instance, four bread products (such as two buns cut in half) can be placed on the four clusters of perforations.

Before going on to the heating and water components of steamer apparatus 12, reference is made to FIG. 5 wherein it can be seen that an interior support plate, generally designated 52, is supported on top of bottom wall 18a of lower shelf half 18 by a pair of support brackets 54. A generally U-shaped partition 56 defines a preheating chamber, generally designated 58, within the bounds of the U-shaped partition. As seen in FIGS. 6 and 7, preheating chamber 58 is located immediately beneath the heated platen defined by bottom wall 32a of the one-piece heated module 32.

As best seen in FIG. 7, a heating element, generally designated 60, is secured to the one-piece heated module 32 and includes a plurality of heating portions 60a embedded or cast within bottom wall 32a of heated module 32, to form the heated platen and main flashing surface 34 of the steamer apparatus. It should be understood that flashing surface 34 is called a "main" flashing surface because side walls 32b of the one-piece heated module are cast integral with bottom wall 32a, and the insides of the side walls, consequently, also form flashing surfaces should any water droplets be impinged thereupon. FIG. 7 shows a main electrical plug 62 which is electrically coupled by appropriate wiring to heating element 60.

Figure 10:
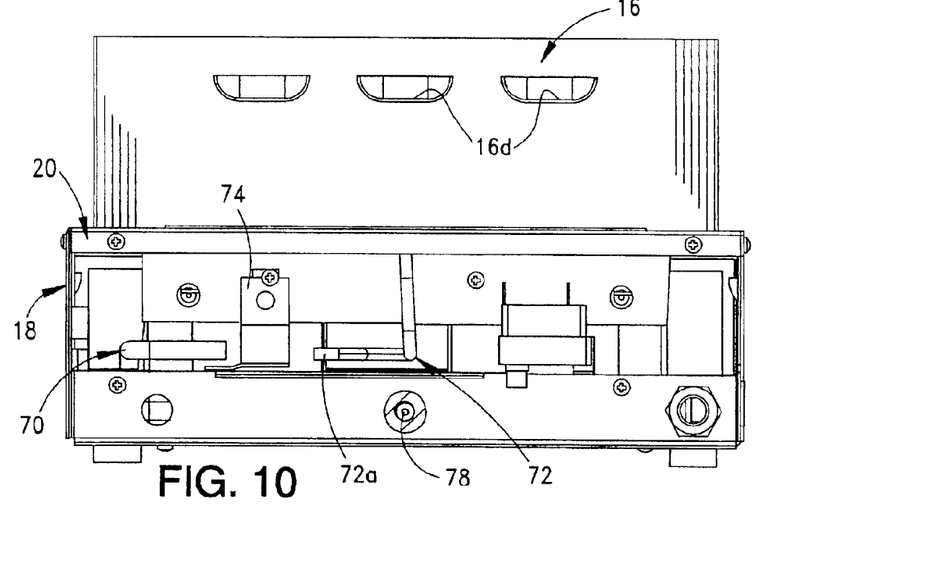
FIG. 10 is a vertical section taken generally along line 10—10 of FIG. 2.

Generally, steamer apparatus 12 includes water delivery means for delivering water onto main flashing surface 34 of heated platen 32a to convert the water into steam in steam chamber 36. Specifically, the water delivery means include first and second water conduits, generally designated 70 and 72, respectively, in FIG. 5. The water conduits may be stainless steel pipes and also can be seen in FIGS. 6, 8 and 10. First water conduit 70 is connected to a water metering valve 74. Second water conduit 72 includes a nozzle 76 which communicates with steam chamber 36 for spraying water onto heated platen 32a. Opposite ends 70a and 72a of the water conduits are connected by flexible pipes or hoses (not shown). A water inlet 78 (FIG. 10) also is connected to metering valve 74 by appropriate pipes or hoses.

Figure 8:
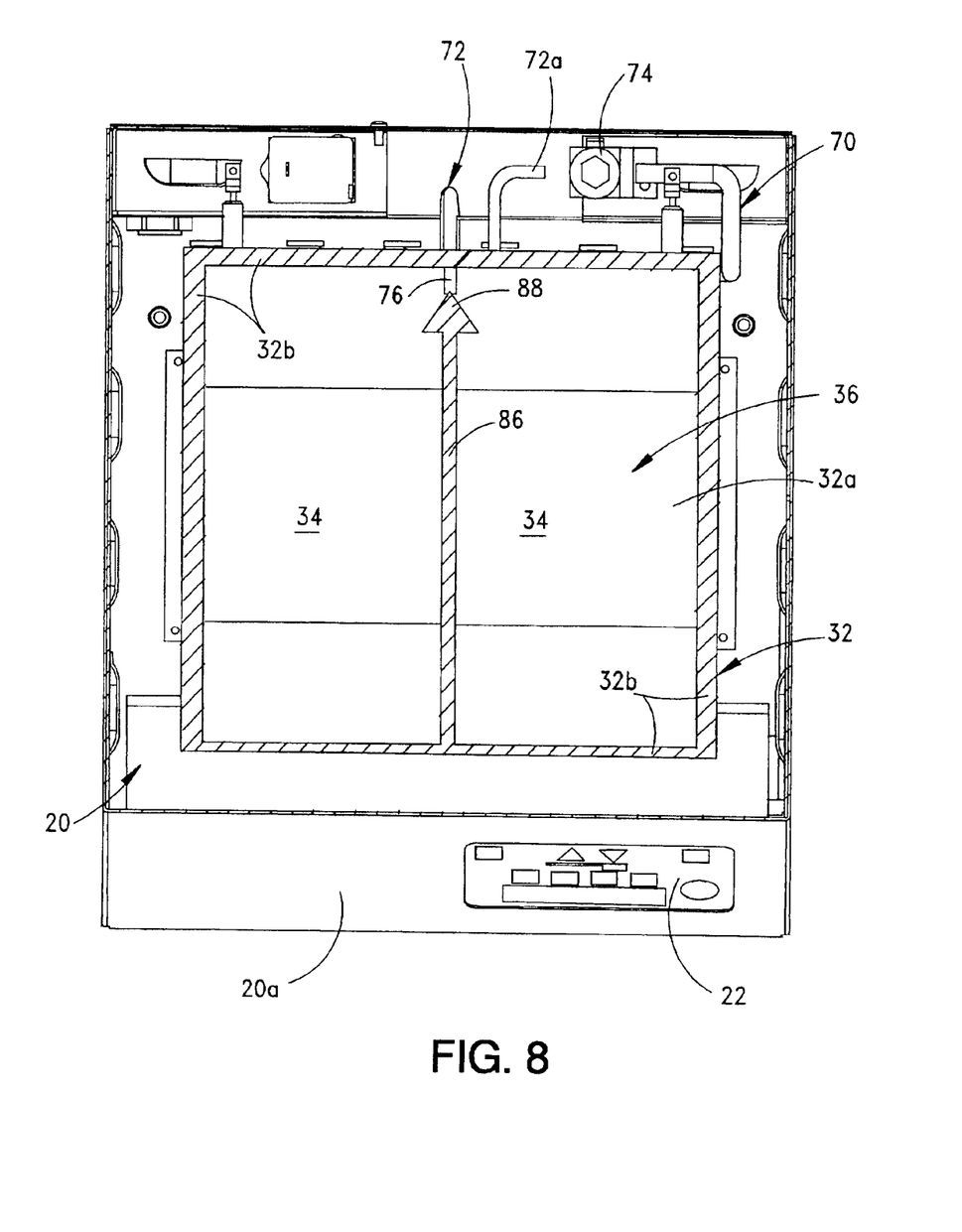
FIG. 8 is a horizontal section taken generally along line 8—8 of FIG. 4.
Figure 9:
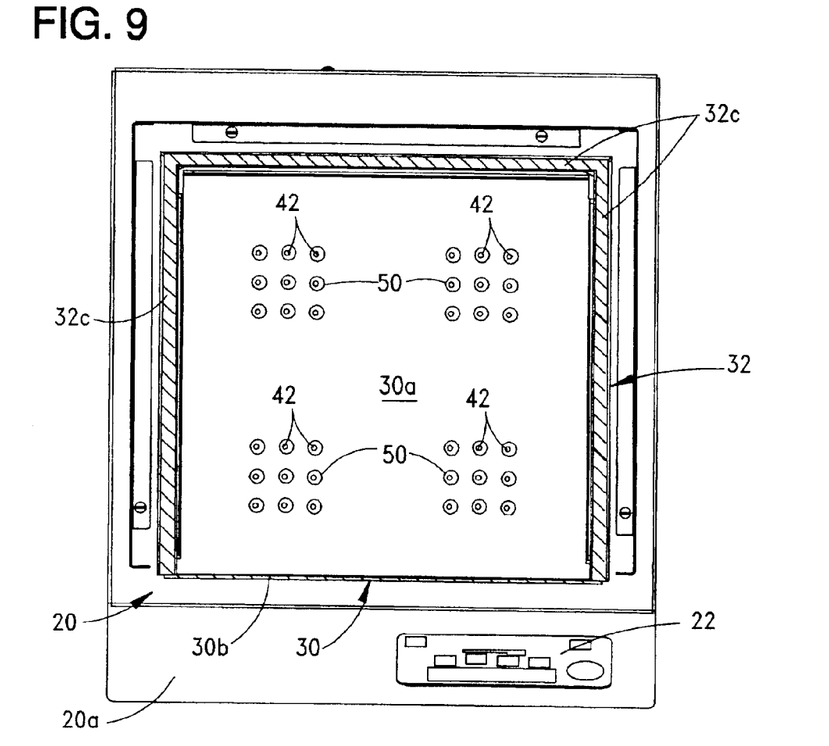
FIG. 9 is a horizontal section taken generally along line 9—9 of FIG. 4.

FIGS. 6 and 8 show how nozzle 76 of second water conduit 72 projects through a side wall of heated module 32 and into steam chamber 36 for spraying water onto the flashing surface of heated platen 32a. FIG. 6 shows that a length 80 of the second water conduit is disposed within preheating chamber 58 in close proximity to the underside of heated platen 32a. In fact, FIG. 5 shows that the length 80 of the second water conduit is U-shaped to provide two substantial runs of the conduit within the preheating chamber and in close proximity to the heated platen. Therefore, water in water conduit 72 is preheated before it is sprayed onto the heated platen. It is heated by the temperature of the air in preheating chamber 58 as well as its close proximity to the heated platen, itself, which may be on the order of ¼ inch. By this arrangement, the same heating means which heats the platen also preheats the water in conduit 72. Consequently, heated platen 32a performs a dual function in steamer apparatus 12 of converting water into steam in steam chamber 36 as well as preheating the water in conduit 72. No additional or extraneous preheating means is required.

FIG. 6 shows that first water conduit 70 also is in a chamber, generally designated 82, which receives heat from preheating chamber 58 and heated platen 32a. Therefore, water in first water conduit 70 is somewhat preheated before the water flows into second water conduit 72 where the main preheating takes place.

Referring to FIGS. 5 and 8, the one-piece cast metal heated module 32 includes an integral partition 86 which projects upwardly from main flashing surface 34 of heated platen 32a. This integral partition divides steam chamber 36 into two substantially equal portions. Partition 86 has a triangular deflector 88 at the front thereof in-line with nozzle 76 of water conduit 72. The deflector is effective to deflect water from nozzle 72 equally into both chamber portions on opposite sides of partition 86.

Water is fed from a source thereof to water inlet 78 (FIGS. 4 and 10) and then to metering valve 74 which is controlled manually or automatically by appropriate electronic controls coupled to control panel 22. The water flows into first water conduit 72 wherein the water is preheated in preheating chamber 82 (FIG. 6) to a temperature on the order of 90–105° F. The water is fed from the first water conduit through appropriate pipes or hoses to second water conduit 72 whereat the water is preheated within preheating chamber 58 to a temperature on order of 180–190° F. This preheated water is delivered or sprayed onto main flashing surface 34 of heated platen 32a whereat the water is instantaneously "flashed" and converted to steam within steam chamber 36. In actual practice, the temperature within preheating chamber 58 may be on the order of 230° F., which results in preheating the water in second water conduit 72 to a temperature on the order of 180–190° F. The temperature of the heated platen can be maintained on the order of 250° F. By preheating the water, this temperature is significantly reduced from apparatus of the prior art. In addition, other advantages include a practically 100% instant conversion of the delivered water to steam practically instantaneously. In addition, the time between steam cycles is reduced considerably.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A steamer apparatus for steaming bread-type food products including buns, rolls, croissants, bagels and the like comprising:
    a housing defining a steam chamber and having a heated platen therein;
    a substantially enclosed preheating chamber having side walls and a bottom wall, the overheating chamber being separate from the housing and in proximity to the heated platen;
    a water conduit for delivering water onto the heated platen to convert the water into steam in the steam chamber; and
    said water conduit running through said preheating chamber for preheating the water in the housing prior to delivering the water to the heated platen.

2. The steam apparatus of claim 1 wherein said heated platen is part of a one-piece heated module which has a bottom wall and side walls defining the bottom wall and side walls of the steam chamber.

3. The steam apparatus of claim 2 wherein said heated module is fabricated of cast metal material.

4. The steam apparatus of claim 3 wherein said cast metal material includes aluminum.

5. The steam apparatus of claim 3, including at least one heating element cast into at least the bottom wall of the heated module.

6. The steam apparatus of claim 2, including a perforated top venturi plate spaced above the bottom wall and spanning the side walls to substantially enclose the steam chamber.

7. The steam apparatus of claim 6 wherein the side walls of said one-piece heated module have top wall extensions which extend above the venturi plate and define a heated chamber above the venturi plate heated by the heated module.

8. The steam apparatus of claim 1 wherein said water conduit has a nozzle communicating with the steam chamber for spraying water onto the heated platen.

9. The steam apparatus of claim 8 wherein said steam chamber is divided into at least two portions, and including deflector means for deflecting the water from the nozzle into both chamber portions.

10. A steamer apparatus for steaming bread-type food products including buns, rolls, croissants, bagels and the like, comprising:
    a housing defining a steam chamber;
    a heated platen defining a bottom wall of the steam chamber;
    a substantially enclosed preheating chamber having side walls and a bottom wall, the preheating chamber being separate from the housing and immediately beneath the heated platen;
    and a water conduit for delivering water onto the top of the heated platen to convert the water into steam in the steam chamber, at least a portion of the water conduit running through the preheating chamber to thereby preheat the water, whereby the heated platen performs a dual function of converting the water to steam and preheating the water in said at least a portion of the water delivery means.

11. The steam apparatus of claim 10 wherein said water conduit includes a nozzle communicating with the steam chamber for spraying water onto the heated platen.

12. The steam apparatus of claim 10 wherein said heated platen is part of a one-piece heated module which has a bottom wall and side walls defining the bottom wall and side walls of the steam chamber.

13. The steam apparatus of claim 12 wherein said heated module is fabricated of cast metal material.

14. The steam apparatus of claim 13 wherein said cast metal material includes aluminum.

15. The steam apparatus of claim 13 including at least one heating element cast into at least the bottom wall of the heated module.

16. The steam apparatus of claim 12, including a perforated top venturi plate spaced above the bottom wall and spanning the side walls to substantially enclose the steam chamber.

17. A steamer apparatus for steaming bread-type food products including buns, rolls, croissants, bagels and the like, comprising:
    a housing;
    a one-piece heated module separate from the housing and including a bottom wall and integral upstanding side walls defining a steam chamber, the bottom wall defining a heated platen, and the side walls having top wall extensions which extend above the side walls to define a heated chamber above the steam chamber; and
    water delivery means for delivering water onto the heated platen to convert the water into steam in the steam chamber.

18. The steam apparatus of claim 17 wherein said one-piece heated module, including said bottom wall and integral side walls, is fabricated of cast metal material.

19. The steam apparatus of claim 18 wherein said cast metal material includes aluminum.

20. The steam apparatus of claim 18, including at least one heating element cast into at least the bottom wall of the heated module.

21. The steam apparatus of claim 17, including a perforated top venturi plate spaced above the bottom wall and spanning the side walls to substantially enclose the steam chamber.

22. The steam apparatus of claim 21 wherein the side walls of said one-piece heated module have top wall extensions which extend above the venturi plate and define a heated chamber above the venturi plate heated by the heated module.

* * * * *